(12) United States Patent
Sakai et al.

(10) Patent No.: US 12,407,011 B2
(45) Date of Patent: Sep. 2, 2025

(54) FUEL CELL SYSTEM

(71) Applicant: HONDA MOTOR CO., LTD., Tokyo (JP)

(72) Inventors: Ryoji Sakai, Wako (JP); Kazuhide Inoue, Wako (JP); Takuto Nakagawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 672 days.

(21) Appl. No.: 17/680,229

(22) Filed: Feb. 24, 2022

(65) Prior Publication Data

US 2022/0320552 A1 Oct. 6, 2022

(30) Foreign Application Priority Data

Mar. 31, 2021 (JP) ................................ 2021-058974

(51) Int. Cl.
| | |
|---|---|
| *H01M 8/04858* | (2016.01) |
| *B60L 58/30* | (2019.01) |
| *H01M 8/04537* | (2016.01) |
| *H01M 8/04746* | (2016.01) |

(52) U.S. Cl.
CPC ......... *H01M 8/04932* (2013.01); *B60L 58/30* (2019.02); *H01M 8/04552* (2013.01); *H01M 8/04753* (2013.01); *H01M 2250/20* (2013.01)

(58) Field of Classification Search
CPC ......... H01M 8/04932; H01M 8/04552; H01M 8/04753; H01M 2250/20; H01M 8/04992; H01M 8/04798; H01M 8/04201; B60L 58/30
See application file for complete search history.

(56) References Cited

U.S. PATENT DOCUMENTS

| | | | |
|---|---|---|---|
| 2005/0244688 A1 | 11/2005 | Suzuki | |
| 2006/0068243 A1* | 3/2006 | Lienkamp | H01M 8/04992 |
| | | | 429/432 |
| 2009/0220832 A1* | 9/2009 | Reiser | H01M 8/04753 |
| | | | 429/429 |
| 2011/0244351 A1 | 10/2011 | Park et al. | |

(Continued)

FOREIGN PATENT DOCUMENTS

| | | |
|---|---|---|
| CN | 1692519 A | 11/2005 |
| CN | 102214831 A | 10/2011 |

(Continued)

OTHER PUBLICATIONS

Office Action dated Dec. 13, 2022 issued over the corresponding Japanese Patent Application No. 2021-058974 with the English translation thereof.

(Continued)

*Primary Examiner* — Nicholas A Smith
*Assistant Examiner* — Seamus Patrick McNulty
(74) *Attorney, Agent, or Firm* — Carrier, Shende & Associates P.C; Fulchand P. Shende; Joseph P. Carrier

(57) ABSTRACT

When controlling the power generation state of a fuel cell stack based on a generated current command value, a control device sets the generated current command value based on a generated power command value and a generated voltage acquired by a voltage sensor such that the following expression is satisfied, regardless of whether a bleed valve is opened or closed: generated current command value=generated power command value/generated voltage.

3 Claims, 9 Drawing Sheets

(56) References Cited

U.S. PATENT DOCUMENTS

| 2013/0004870 A1 | 1/2013 | Mizuno et al. |
| 2013/0130140 A1 | 5/2013 | Kato et al. |
| 2013/0288148 A1* | 10/2013 | Kazuno ............ H01M 8/04619 |
| | | 429/444 |
| 2019/0198897 A1 | 6/2019 | Okamura et al. |

FOREIGN PATENT DOCUMENTS

| CN | 102414889 A | 4/2012 |
| CN | 109950582 A | 6/2019 |
| JP | H08-138711 A | 5/1996 |
| JP | 2005-259576 A | 9/2005 |
| JP | 2007-080723 A | 3/2007 |
| JP | 2008-034253 A | 2/2008 |
| JP | 2008-288147 A | 11/2008 |
| JP | 2011-187391 A | 9/2011 |
| JP | 2012-114056 A | 6/2012 |
| JP | 2019-114351 A | 7/2019 |

OTHER PUBLICATIONS

Office Action dated Oct. 16, 2024 issued in the corresponding Chinese Patent Application No. 202210183318.2 with the English machine translation thereof.

Office Action dated Dec. 5, 2023 issued in the corresponding Japanese Application No. 2023-045030, which is a divisional application of JP 2021-058974, and the English machine translation thereof.

* cited by examiner

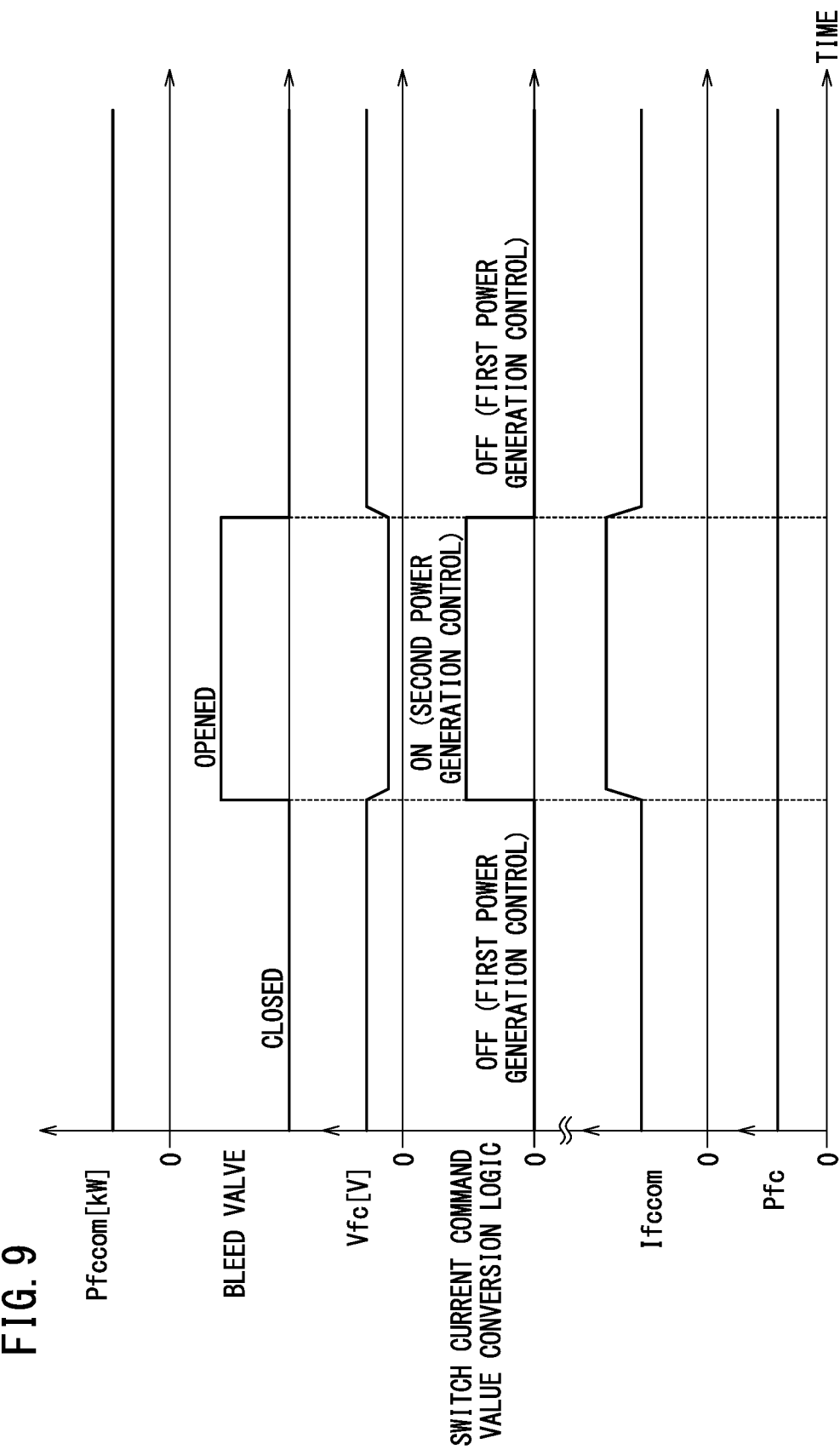

FUEL CELL SYSTEM

CROSS-REFERENCE TO RELATED APPLICATIONS

This application is based upon and claims the benefit of priority from Japanese Patent Application No. 2021-058974 filed on Mar. 31, 2021, the contents of which are incorporated herein by reference.

BACKGROUND OF THE INVENTION

Field of the Invention

The present invention relates to a fuel cell system including a fuel cell that generates power by means of a fuel gas supplied to an anode through a fuel gas supply flow path, and an oxygen-containing gas supplied to a cathode through an oxygen-containing gas supply flow path.

Description of the Related Art

For example, a solid polymer electrolyte fuel cell is provided with a membrane electrode assembly (MEA) in which an anode is disposed on one surface of an electrolyte membrane made of a polymer ion exchange membrane and a cathode is disposed on the other surface of the electrolyte membrane. A power generation cell (unit cell) is formed by sandwiching the membrane electrode assembly between separators.

Usually, a predetermined number of power generation cells are stacked to be incorporated into, for example, a fuel cell vehicle (fuel cell electric vehicle) or the like as a fuel cell stack.

In this type of fuel cell, for efficient use of fuel gas, fuel exhaust gas discharged from the outlet side of the anode of the fuel cell is circulated again into the anode from the inlet side of the anode.

The fuel exhaust gas is mainly formed of unreacted fuel gas and nitrogen gas that permeates through the electrolyte membrane from the cathode side.

In such a configuration, there is a concern about deterioration of the electrolyte membrane, or so-called membrane deterioration, due to a decrease in the concentration of fuel gas (shortage of fuel gas) in the anode.

In order to suppress the occurrence of membrane deterioration, for example, a technique disclosed in JP 2019-114351 A can be used.

In this technique, by opening an on-off valve of a connection flow path, fuel exhaust gas containing nitrogen gas and discharged from the outlet side of the anode of the fuel cell is returned to the inlet side of the cathode via the connection flow path, and circulated to the cathode. In this case, in the cathode, the unreacted fuel gas and oxygen-containing gas supplied to the cathode from the outside react with each other by a catalytic reaction to produce water, and the produced water and the nitrogen gas are discharged to the outside from the outlet side of the cathode.

Thus, it is possible to suppress a decrease in the concentration of the fuel gas flowing through the anode due to an increase of the nitrogen gas on the anode side.

SUMMARY OF THE INVENTION

However, in the technique disclosed in JP 2019-114351 A, when the on-off valve of the connection flow path is opened, the voltage of the power generation cell decreases because of a shortage of the oxygen-containing gas that contributes to the power generation on the cathode side, due to the catalytic reaction.

Therefore, in a fuel cell system in which the generated current of the fuel cell is controlled based on a generated current command value, there is a problem that the generated power decreases.

The present invention has been made in view of such a problem and an object thereof is to provide a fuel cell system capable of avoiding or suppressing a change in generated power even when a generated voltage is lowered by opening an on-off valve of a connection flow path for supplying fuel exhaust gas to the inlet side of a cathode.

According to one aspect of the present invention, provided is a fuel cell system comprising a fuel cell configured to generate power using a fuel gas supplied to an anode through a fuel gas supply flow path and an oxygen-containing gas supplied to a cathode through an oxygen-containing gas supply flow path, the fuel cell system further comprising: a fuel exhaust gas flow path through which a fuel exhaust gas discharged from the anode flows; a connection flow path configured to allow the fuel exhaust gas flow path and the oxygen-containing gas supply flow path to communicate with each other; an on-off valve configured to open or close the connection flow path; a control device configured to control a state of supply of the fuel gas to the fuel cell and a state of supply of the oxygen-containing gas to the fuel cell; and a voltage acquirer configured to acquire a generated voltage of the fuel cell, wherein, when controlling a power generation state of the fuel cell based on a generated current command value, the control device sets the generated current command value based on a generated power command value and the generated voltage acquired by the voltage acquirer.

According to another aspect of the present invention, provided is a fuel cell system comprising a fuel cell configured to generate power using a fuel gas supplied to an anode through a fuel gas supply flow path and an oxygen-containing gas supplied to a cathode through an oxygen-containing gas supply flow path, the fuel cell system further comprising: a fuel exhaust gas flow path through which a fuel exhaust gas discharged from the anode flows; a connection flow path configured to allow the fuel exhaust gas flow path and the oxygen-containing gas supply flow path to communicate with each other; an on-off valve configured to open or close the connection flow path; a control device configured to control a state of supply of the fuel gas to the fuel cell and a state of supply of the oxygen-containing gas to the fuel cell; and a voltage acquirer configured to acquire a generated voltage of the fuel cell, wherein, when controlling a power generation state of the fuel cell based on a generated current command value, the control device performs first power generation control in which the generated current command value is set based on a generated power command value during closing of the on-off valve, and performs second power generation control in which the generated current command value is set based on the generated power command value and the generated voltage during opening of the on-off valve.

According to one aspect of the present invention, even when the on-off valve is opened to cause the fuel exhaust gas to flow through the cathode and the generated voltage of the fuel cell therefore decreases, a change in the generated power can be avoided or suppressed since the generated current command value is increased based on the decrease in the generated voltage. Since the power generation control is not changed in this control, the control can be simplified.

According to the other aspect of the present invention, during power generation, when the concentration of the fuel gas flowing through the anode decreases due to the influence of nitrogen gas permeating from the cathode side to the anode, and the on-off valve of the connection flow path allowing the fuel exhaust gas flow path and the oxygen-containing gas supply flow path to communicate with each other is therefore opened, the generated current command value is set based on the generated power command value and the generated voltage. Therefore, the generated power of the fuel cell does not change or the change of the generated power of the fuel cell can be suppressed even if the fuel gas concentration control (fuel gas concentration decrease prevention control) at the anode is performed.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 9 is a time chart for explaining an example of the operation in the second embodiment.

DESCRIPTION OF THE INVENTION

Embodiments of a fuel cell system according to the present invention will be described below in detail with reference to the accompanying drawings.

First Embodiment

[Configuration]

Figure 1:
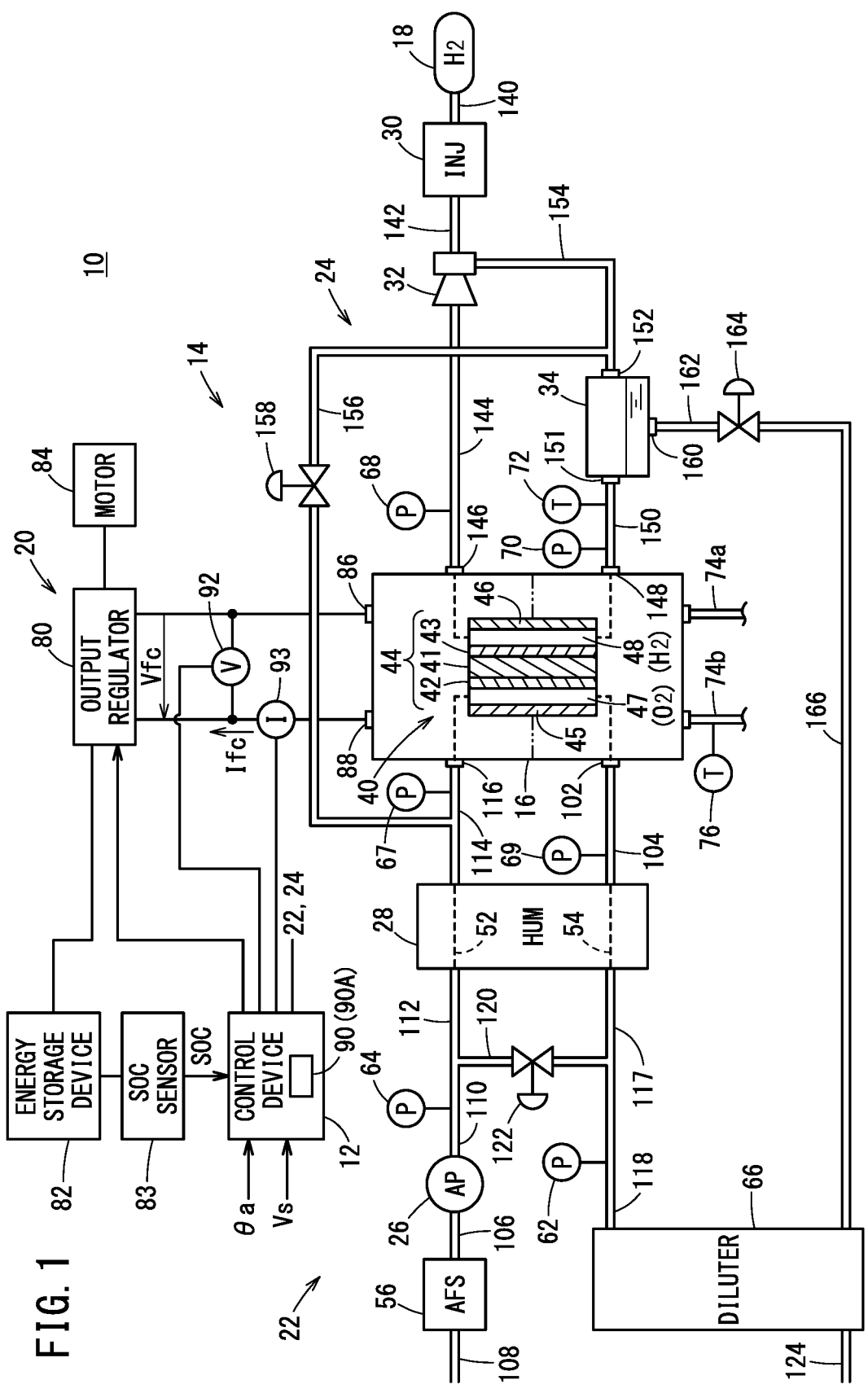
FIG. 1 is a schematic block diagram showing the configuration of a fuel cell vehicle in which a fuel cell system according to a first embodiment is incorporated.

FIG. 1 is a schematic block diagram showing the configuration of a fuel cell vehicle 10 in which a fuel cell system 14 according to a first embodiment is incorporated.

The fuel cell vehicle 10 includes a control device 12 for controlling the entire fuel cell vehicle 10, the fuel cell system 14, and an output unit 20 electrically connected to the fuel cell system 14.

The fuel cell system 14 is basically constituted by a fuel cell stack (also referred to simply as a fuel cell) 16, a hydrogen tank 18, an oxygen-containing gas-related device 22, and a fuel gas-related device 24.

The oxygen-containing gas-related device 22 includes an air pump 26 and a humidifier (HUM) 28.

The fuel gas-related device 24 includes an injector (INJ) 30, an ejector (EJT) 32, and a gas-liquid separator 34.

In the fuel cell stack 16, a plurality of power generation cells 40 are stacked. The power generation cells 40 each include a membrane electrode assembly 44, and separators 45 and 46 that sandwich the membrane electrode assembly 44.

The membrane electrode assembly 44 includes, for example, a solid polymer electrolyte membrane 41 which is a perfluorosulfonic acid thin membrane containing water, and a cathode 42 and an anode 43 that sandwich the solid polymer electrolyte membrane 41.

The cathode 42 and the anode 43 each include a gas diffusion layer (not shown) made of carbon paper or the like. The porous carbon particles having a platinum alloy supported on the surface thereof are uniformly applied to the surface of the gas diffusion layer to form an electrode catalyst layer (not shown). The electrode catalyst layers are formed on both surfaces of the solid polymer electrolyte membrane 41.

A cathode flow field (oxygen-containing gas flow field) 47 that allows an oxygen-containing gas inlet communication port 116 and an oxygen-containing gas outlet communication port 102 to communicate with each other is formed on the surface of the separator 45 that faces the membrane electrode assembly 44.

An anode flow field (fuel gas flow field) 48 that allows a fuel gas inlet communication port 146 and a fuel gas outlet communication port 148 to communicate with each other is formed on the surface of the separator 46 that faces the membrane electrode assembly 44.

In the anode 43, when the fuel gas is supplied, hydrogen ions are generated from hydrogen molecules by an electrode reaction by the catalyst, and the hydrogen ions pass through the solid polymer electrolyte membrane 41 and move to the cathode 42, while electrons are released from the hydrogen molecules.

The electrons released from the hydrogen molecules move from a negative electrode terminal 86 through an output regulator 80 and an external load such as a motor 84 to the cathode 42 via a positive electrode terminal 88.

At the cathode 42, hydrogen ions and electrons react with oxygen contained in the supplied oxygen-containing gas by the action of the catalyst to produce water.

A voltage sensor 92 for detecting a generated voltage Vfc is provided between the positive electrode terminal 88 and the negative electrode terminal 86. Furthermore, a current sensor 93 for detecting a generated current Ifc is provided in the wiring between the positive electrode terminal 88 and the output regulator 80.

The air pump 26 is formed of a mechanical supercharger or the like driven by an inverter and a motor (not shown) to which power of an energy storage device 82 is supplied, and has a function of sucking and pressurizing atmospheric air (air), and supplying it to the humidifier 28.

The humidifier 28 includes a flow path 52 through which the oxygen-containing gas (dry air) flows, and a flow path 54 through which exhaust gas from the cathode flow field 47 of the fuel cell stack 16 flows through the oxygen-containing gas outlet communication port 102 of the fuel cell stack 16 and a pipeline 104.

The exhaust gas from the cathode flow field 47 of the fuel cell stack 16 is humid oxygen-containing exhaust gas when a bleed valve 158 is closed or humid oxygen-containing exhaust gas mixed with fuel exhaust gas when the bleed valve 158 is opened.

The pipeline 104 is provided with a cathode outlet pressure sensor 69 that detects the pressure of the exhaust gas flowing through the pipeline 104 as a cathode outlet pressure Pco [kPa].

The humidifier 28 has a function of humidifying the oxygen-containing gas supplied from the air pump 26. That is, the humidifier 28 transfers moisture contained in the exhaust gas to the supply gas (oxygen-containing gas) through the porous membrane.

A suction port side of the air pump 26 communicates with the atmosphere through a pipeline 106, an air flow sensor (AFS) (flow rate sensor) 56, and a pipeline 108.

The air flow sensor 56 measures a mass flow rate M [g/min] of the oxygen-containing gas supplied from the air pump 26 to the cathode flow field 47 of the fuel cell stack 16, and outputs the measured mass flow rate to the control device 12.

A discharge port side of the air pump 26 communicates with one end side of the flow path 52 of the humidifier 28 through pipelines 110 and 112. The other end side of the flow path 52 of the humidifier 28 communicates with one end side of a pipeline 114 (oxygen-containing gas supply flow path), and the other end side of the pipeline 114 communicates with the cathode flow field 47 in the fuel cell stack 16 through the oxygen-containing gas inlet communication port 116.

The pipeline 110 is provided with a discharge pressure sensor 64 that detects the pressure of the oxygen-containing gas discharged from the air pump 26 as an oxygen-containing gas discharge pressure Po [kPa].

The pipeline 114 is provided with a cathode inlet pressure sensor 67 that detects the pressure of the oxygen-containing gas flowing through the pipeline 114 as a cathode inlet pressure Pci [kPa].

A discharge side of the flow path 54 of the humidifier 28 communicates with one inlet side of a diluter 66 through pipelines 117 and 118.

The pipeline 110 on the discharge port side of the air pump 26 branches such that one of the branched pipelines communicates with the pipeline 112, and the other of the branched pipelines communicates with the pipeline 118 via a bypass pipeline 120 and a bypass valve 122.

The pipeline 118 is provided with a diluter inlet pressure sensor 62 that detects the pressure of gas flowing through the pipeline 118 as a diluter inlet pressure Pd [kPa].

The hydrogen tank 18 includes an electromagnetically operated shut-off valve, and is a container that stores high-purity hydrogen compressed at high pressure.

The fuel gas discharged from the hydrogen tank 18 is supplied to the inlet of the anode flow field 48 of the fuel cell stack 16 through a pipeline 140, the injector 30, a pipeline 142, the ejector 32, and a pipeline 144 (fuel gas supply flow path), via the fuel gas inlet communication port 146.

The pipeline 144 is provided with an anode inlet pressure sensor 68 that detects the pressure of the fuel gas flowing through the pipeline 144 as an anode inlet pressure Pai [kPa].

The outlet of the anode flow field 48 communicates with an inlet 151 of the gas-liquid separator 34 through the fuel gas outlet communication port 148 and a pipeline 150 (fuel exhaust gas flow path), and fuel exhaust gas (anode off-gas), which is hydrogen-containing gas, is supplied from the anode flow field 48 to the gas-liquid separator 34.

The pipeline 150 is provided with an anode outlet pressure sensor 70 that detects the pressure of the fuel exhaust gas flowing through the pipeline 150 as an anode outlet pressure Poa [kPa], and an anode outlet temperature sensor 72 that detects the temperature of the fuel exhaust gas flowing through the pipeline 150 as an anode outlet temperature Toa [° C.].

The gas-liquid separator 34 separates the fuel exhaust gas into a gas component and a liquid component (liquid water). The gas component of the fuel exhaust gas is discharged from a gas discharge port 152 of the gas-liquid separator 34 and supplied to the ejector 32 through a pipeline 154. On the other hand, when the bleed valve 158 is opened as necessary, the fuel exhaust gas is also supplied to the pipeline 114 for oxygen-containing gas through a communication pipeline 156 (communication flow path) and the bleed valve 158 (on-off valve).

The bleed valve 158 is opened to prevent deterioration of the anode 43 caused by a decrease in the hydrogen concentration in the anode flow field 48 due to nitrogen gas present in the cathode flow field 47 permeating through the membrane electrode assembly 44. That is, the bleed valve 158 is opened when it is determined that the hydrogen concentration in the anode flow field 48 has decreased during normal power generation such as during traveling.

The fuel exhaust gas supplied to the pipeline 114 for oxygen-containing gas is mixed, in the pipeline 114, with the oxygen-containing gas supplied from the air pump 26, and is supplied to the cathode flow field 47 of the fuel cell stack 16 through the oxygen-containing gas inlet communication port 116.

A part of the fuel exhaust gas supplied to the cathode flow field 47 is hydrogen-ionized by the catalytic reaction of the cathode 42, and the hydrogen ions react with the oxygen-containing gas to produce water. The remaining unreacted fuel exhaust gas is discharged from the oxygen-containing gas outlet communication port 102, flows through the pipeline 104, the flow path 54, and the pipelines 117 and 118, is diluted in the diluter 66 by the oxygen-containing gas supplied from the bypass pipeline 120, and is discharged to the outside (atmosphere) of the fuel cell vehicle 10 through a pipeline 124.

Fuel gas is supplied to the ejector 32 from the injector 30 provided on the upstream side of the ejector 32, through the pipeline 142. Therefore, the fuel exhaust gas (the gas component) supplied via the gas-liquid separator 34 is sucked by the ejector 32 and mixed with the fuel gas, and, in this state, supplied to the anode flow field 48 of the fuel cell stack 16 via the fuel gas inlet communication port 146 through the pipeline 144 of the fuel cell stack 16.

The liquid component of the fuel exhaust gas is discharged from a liquid discharge port 160 of the gas-liquid separator 34 to the outside of the fuel cell vehicle 10 through a pipeline 162, a drain valve 164, a pipeline 166, the diluter 66, and the pipeline 124.

Actually, a part of the fuel exhaust gas is discharged from the drain valve 164 to the pipeline 166 together with the liquid component. In order to discharge the fuel exhaust gas to the outside after diluting the hydrogen gas in the fuel exhaust gas, a part of the oxygen-containing gas discharged from the air pump 26 is supplied to the diluter 66 through the bypass pipeline 120 and the pipeline 118.

Therefore, after the hydrogen gas in the fuel exhaust gas is diluted in the diluter 66, the fuel exhaust gas is discharged to the outside.

The fuel cell stack 16 is further provided with a coolant supply flow path 74a and a coolant discharge flow path 74b respectively for supplying and discharging a coolant to and from a coolant flow field (not shown) provided in the fuel cell stack 16. A temperature sensor 76 is provided in the coolant discharge flow path 74b, and the temperature sensor 76 measures a temperature Tw [° C.] of the coolant flowing through the coolant discharge flow path 74b as the temperature of the fuel cell stack 16.

The control device 12 is constituted by an electronic control unit (ECU) including a microcomputer including a CPU (not shown), a storage unit (ROM and RAM), and the like.

The storage unit stores, for example, control programs for the fuel cell vehicle 10 and the fuel cell system 14.

The CPU of the control device 12 performs calculation according to the control programs to control the operation of the fuel cell vehicle 10 and the fuel cell system 14.

In order to perform operation control, the control device 12 adjusts the power supply ratio of the generated power of the fuel cell stack 16 and the power of the energy storage device 82 through the output regulator 80, based on an accelerator position θa from an accelerator position sensor that detects the position of an accelerator pedal (not shown), a vehicle speed Vs from a vehicle speed sensor (not shown), an SOC (remaining capacity) from an SOC sensor 83 that detects the SOC of the energy storage device 82, and the like, and controls driving of the motor 84.

Further, when controlling the driving of the motor 84, the control device 12 controls the power generation of the fuel cell system 14 by controlling driving of the components constituting the oxygen-containing gas-related device 22 and the fuel gas-related device 24 based on the supply ratio of the generated power and based on the detection signals received from various sensors in addition to the pressure sensors such as the discharge pressure sensor 64 and the temperature sensors such as the temperature sensor 76.

Figure 2A:
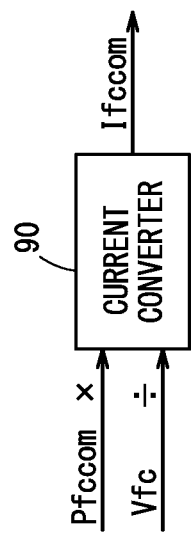
FIG. 2A is a schematic block diagram of a current converter, which is one function of a control device shown in FIG. 1 according to the first embodiment.

As shown in FIG. 2A, the control device 12 also operates as a current converter 90 that outputs a generated current command value Ifccom to the output regulator 80 based on a generated power command value Pfccom and a generated voltage Vfc of the fuel cell stack 16.

The control device 12 may not be a single device and may be divided into two or more units, such as an energy management unit that determines the generated power command value Pfccom of the fuel cell stack 16, a power generation control unit that includes the current converter 90 and controls power generation of the fuel cell stack 16 based on the generated power command value Pfccom, and a motor control unit that controls driving of the motor 84.

[Operation]

Next, the operation of the fuel cell system 14 basically configured as described above will be described in the following order: [1] the operation during normal power generation such as during travel of the fuel cell vehicle 10, etc. (the same operation is performed in a second embodiment described later) [2] the operation of setting the generated current command value Ifccom according to the first embodiment in consideration of a decrease in the hydrogen concentration in the anode flow field 48, and [3] the operation of setting the generated current command value Ifccom according to the second embodiment in consideration of a decrease in the hydrogen concentration in the anode flow field 48.

[1] Description of Operation During Normal Power Generation Such as During Travel of Fuel Cell Vehicle 10, Etc.

Figure 3:
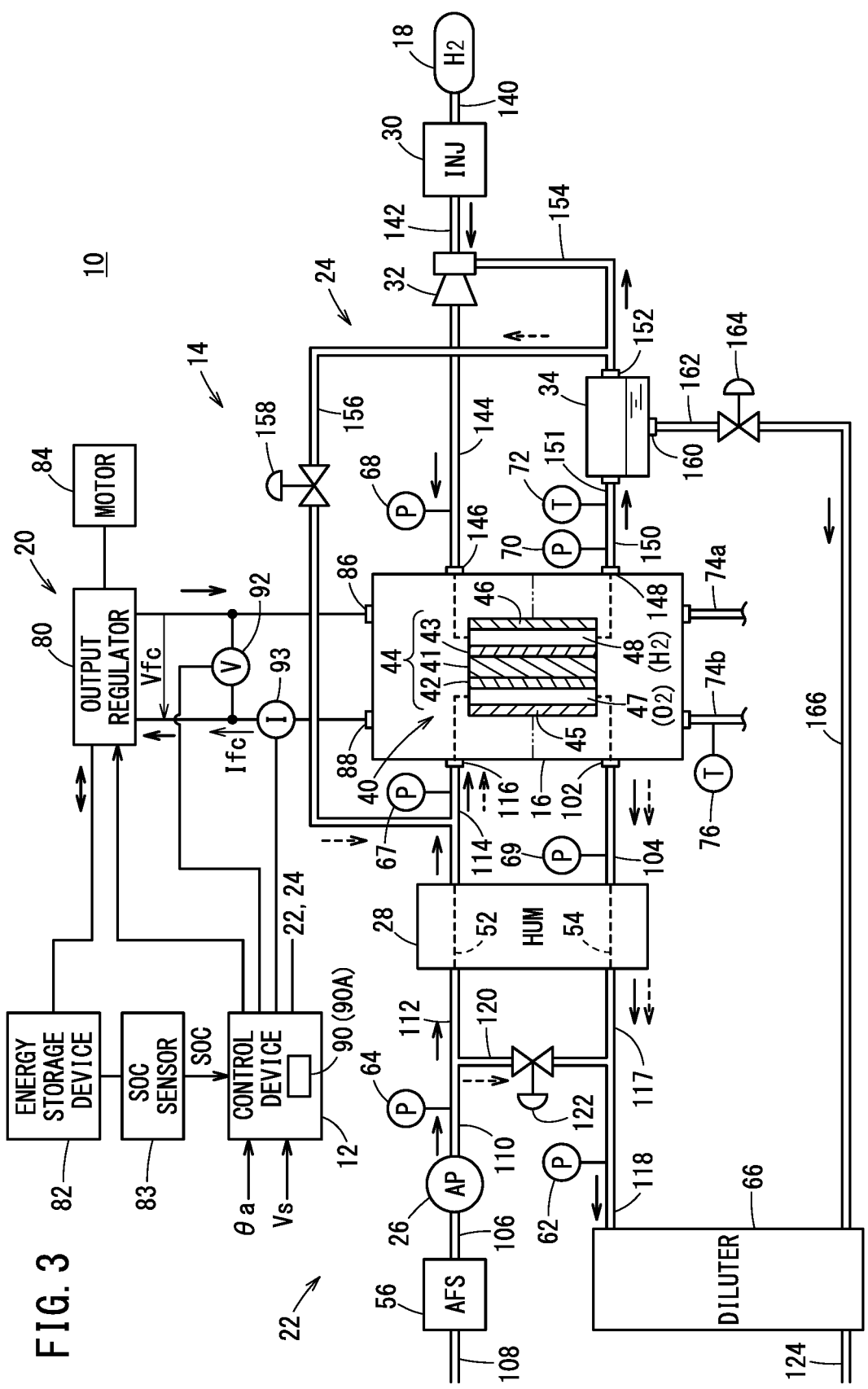
FIG. 3 is a block diagram showing, by arrows, a current flow and a gas flow in the fuel cell system of FIG. 1.

The operation during normal power generation (such as during traveling in the case where the hydrogen concentration on the anode 43 side is in a state that does not require the bleed valve 158 to be opened) will be described below with reference to FIG. 3 in which the flow of fuel gas, the flow of oxygen-containing gas, and the flow of power are indicated by solid line arrows. In FIG. 3, broken line arrows indicate the flow of fuel exhaust gas during opening of the bleed valve 158 described later.

During normal power generation, the bleed valve 158 is closed, and the bypass valve 122 is opened primarily for dilution when the drain valve 164 is opened.

On the oxygen-containing gas-related device 22 side, oxygen-containing gas is discharged from the air pump 26 which operates under the control of the control device 12 by using the high voltage power of the energy storage device 82 as a power source. The oxygen-containing gas discharged from the air pump 26 is humidified through the pipelines 110 and 112 and the humidifier 28, and then supplied through the pipeline 114 to the oxygen-containing gas inlet communication port 116 of the fuel cell stack 16.

The humidifier 28 transfers moisture contained in the humid exhaust gas to the supply gas (oxygen-containing gas) flowing through the flow path 52 through the porous membrane, the humid exhaust gas being discharged from the oxygen-containing gas outlet communication port 102 of the fuel cell stack 16 to the pipeline 104 and flowing through the flow path 54.

On the other hand, on the fuel gas-related device 24 side, fuel gas (hydrogen gas) is supplied from the high-pressure hydrogen tank 18 to the pipeline 142 under the valve opening action of the injector 30. The fuel gas is mixed with the fuel exhaust gas sucked by the ejector 32 through the pipeline (circulation path) 154, passes through the ejector 32, and is supplied to the fuel gas inlet communication port 146 of the fuel cell stack 16.

In the fuel cell stack 16, the oxygen-containing gas is supplied from the oxygen-containing gas inlet communication port 116 to the cathode 42 through the cathode flow field 47 of each power generation cell 40. On the other hand, hydrogen gas is supplied from the fuel gas inlet communication port 146 to the anode 43 through the anode flow field 48 of each power generation cell 40. Therefore, in each power generation cell 40, the oxygen-containing gas contained in the air supplied to the cathode 42 and the hydrogen gas supplied to the anode 43 are partially consumed by an electrochemical reaction (fuel cell reaction) in the electrode catalyst layer to generate power.

Then, the reaction product water and the cathode exhaust gas made of the air supplied to and consumed by the cathode 42 are discharged from the oxygen-containing gas outlet communication port 102, and flow through the pipeline 104 and the flow path 54 to the pipeline 117. The cathode exhaust gas and the produced water flowing through the pipeline 117 are combined with the oxygen-containing gas supplied from the bypass pipeline 120, are supplied through the pipeline 118 to the diluter 66, and are discharged through the diluter 66 to the outside of the fuel cell vehicle 10 via the pipeline 124.

The hydrogen gas supplied to and consumed by the anode 43 is discharged from the fuel gas outlet communication port 148 as fuel exhaust gas (partially consumed fuel gas).

The fuel exhaust gas is introduced into the gas-liquid separator 34 through the pipeline 150 to remove the liquid component (liquid water) thereof, and is then sucked by the ejector 32 through the pipeline 154 to be used for power generation reaction in the fuel cell stack 16.

High-voltage power generated by the fuel cell stack 16 in which a plurality of power generation cells 40 are electrically connected in series is stored in the energy storage device 82 through the output regulator 80.

The energy management unit of the control device 12 determines a generated power command value Pfccom of the fuel cell stack 16 in accordance with load states such as the accelerator position θa of the fuel cell vehicle 10, the vehicle speed Vs, the SOC of the energy storage device 82, and the set temperature of the air conditioner (not shown).

The current converter 90 in the power generation control unit of the control device 12 calculates a generated current command value Ifccom based on a generated power command value Pfccom and a generated voltage Vfc. The current converter 90 controls the oxygen-containing gas-related device 22, the fuel gas-related device 24, and the output regulator 80 so that a generated current Ifc corresponding to the generated current command value Ifccom is generated.

In this case, the fuel cell vehicle 10 travels when the motor 84 is driven by the power of the energy storage device 82 and/or the fuel cell stack 16 under the control of the output regulator 80.

[2] Description of Operation of Setting Generated Current Command Value Ifccom According to First Embodiment in Consideration of Decrease in Hydrogen Concentration in Anode Flow Field 48

This will be described with reference to the flowchart shown in FIG. 4. Although it is (the CPU of) the control device 12 that executes the processing (control programs) according to the flowchart of FIG. 4, it is troublesome to refer to the control device 12 each time, so it is referred to as necessary.

In step S1, a generated power command value Pfccom to be generated in the fuel cell stack 16 is calculated based on the accelerator position θa, the vehicle speed Vs, and the SOC.

In step S2, a generated voltage Vfc is acquired by the voltage sensor 92.

In step S3, the current converter 90 of the control device 12 calculates a generated current command value Ifccom based on the generated power command value Pfccom and the generated voltage Vfc with reference to expression (1).

$$Ifccom = Pfccom/Vfc \quad (1)$$

In step S4, power generation control for the fuel cell stack 16 is performed so that a generated current Ifc detected by the current sensor 93 is equal to Ifccom, based on the generated current command value Ifccom.

Next, in step S5, the concentration of the fuel gas (hydrogen) flowing through the anode flow field 48 is estimated.

In this case, the cathode inlet pressure Pci is acquired from the cathode inlet pressure sensor 67, the anode inlet pressure Pai is acquired from the anode inlet pressure sensor 68, and the temperature Tw of the coolant is acquired from the temperature sensor 76. The temperature Tw of the coolant is substantially equal to the (internal) temperature of the fuel cell stack 16, that is, the temperature of the fuel gas (hydrogen) in the anode flow field 48.

Then, based on the temperature Tw of the coolant, the cathode inlet pressure Pci, and the anode inlet pressure Pai, the permeation amount of nitrogen from the cathode 42 side to the anode 43 side is estimated, whereby the concentration of the fuel gas (hydrogen) in the anode flow field 48 is estimated. The hydrogen concentration may be measured by providing a hydrogen concentration sensor in the pipeline 144 and/or the pipeline 150.

Next, based on the estimated hydrogen concentration, opening/closing control of the bleed valve 158 is performed in steps S6 to S9.

The opening/closing control of the bleed valve 158 will be described with reference to the time chart of FIG. 5 and the power generation schematic diagram of FIG. 6. Note that, in the power generation schematic diagram of FIG. 6, gas such as nitrogen except for oxygen and hydrogen is not shown.

In the fuel cell stack 16, when the concentration of the fuel gas in the anode 43 is lower than a predetermined concentration (a threshold B in FIG. 5) (in other words, when the fuel gas is insufficient), the solid polymer electrolyte membrane 41 becomes deteriorated. Therefore, it is determined in step S6 whether the hydrogen concentration is less than the threshold B.

When the hydrogen concentration is less than the threshold B in the hydrogen concentration determination of step S6 (step S6: YES), the bleed valve 158 is opened in step S7.

When the bleed valve 158 is opened, the fuel exhaust gas discharged from the fuel gas outlet communication port 148 is supplied to the cathode flow field 47 from the oxygen-containing gas inlet communication port 116 through the pipeline 114 via the communication pipeline 156.

Figure 6:
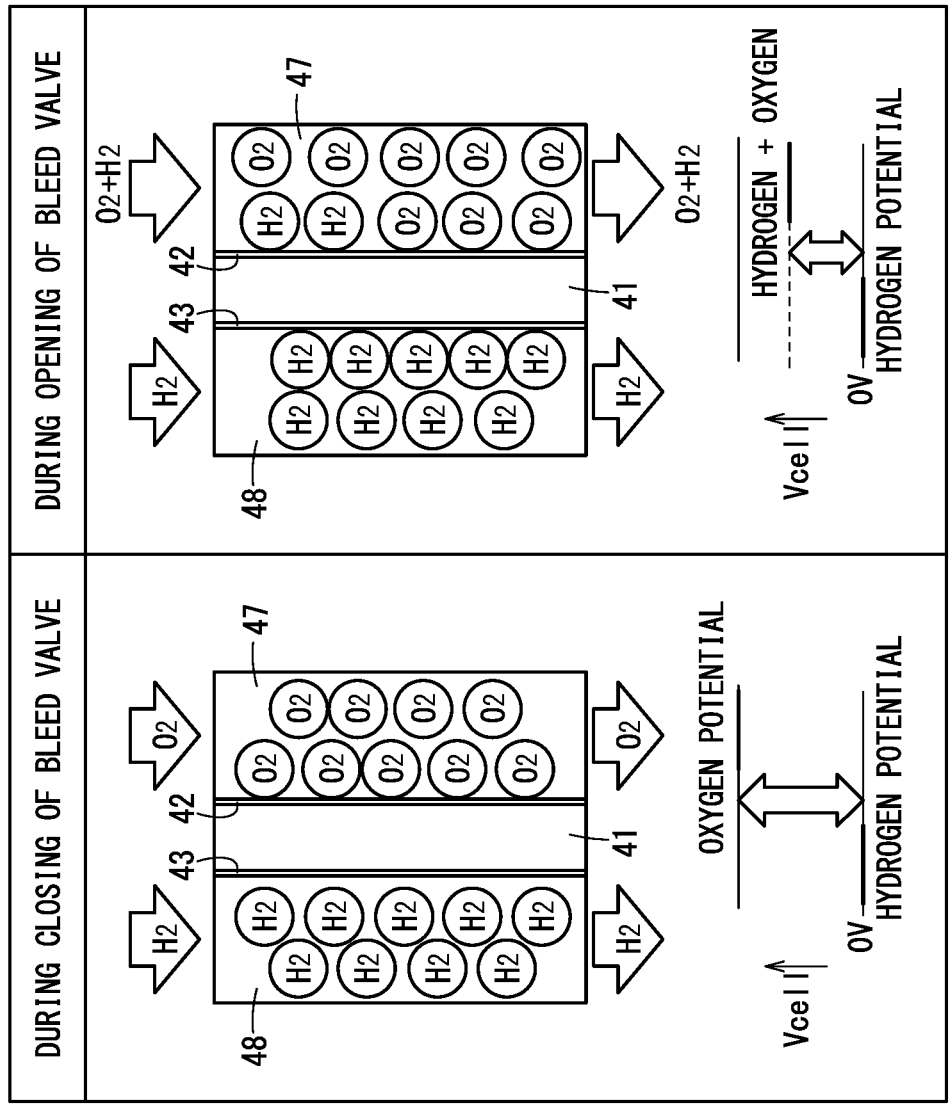
FIG. 6 is an explanatory diagram showing a correspondence relationship between the power generation cell voltage and the opening and closing of the bleed valve.

Therefore, during opening of the bleed valve 158, as shown in "during opening of bleed valve" in FIG. 6, the amount of the oxygen-containing gas decreases on the cathode flow field 47 side, the potential on the cathode 42 side decreases, and a generated cell voltage Vcell [V] decreases. As a result, the generated voltage Vfc of the fuel cell stack 16 decreases.

In the first embodiment, even if the generated voltage Vfc decreases, the control is performed so that the generated current command value Ifccom increases under the action of the current converter 90 as described with reference to the expression (1). Therefore, it is possible to avoid or suppress a decrease in a generated power Pfc caused by the decrease in the generated voltage Vfc.

Further, during opening of the bleed valve 158, the fuel gas discharge amount of the injector 30 is increased to increase the amount of fuel gas supplied from the fuel gas inlet communication port 146 to the anode flow field 48 of the fuel cell stack 16, thereby increasing the hydrogen concentration.

Figure 5:
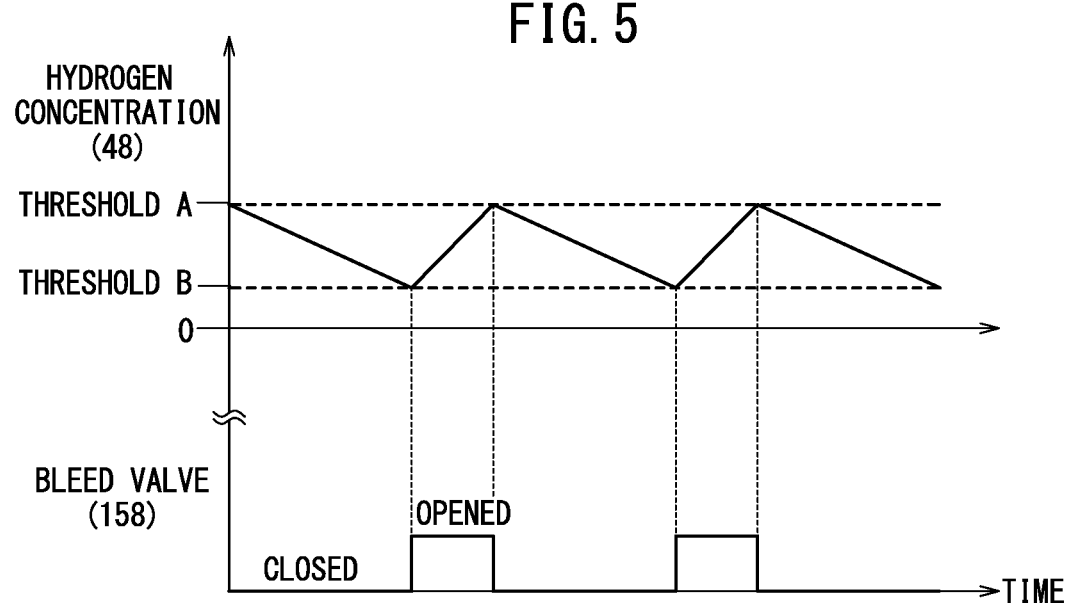
FIG. 5 is a time chart showing a correspondence relationship between opening and closing of a bleed valve and the hydrogen concentration in an anode flow field.

Next, in step S8, in order to suppress a decrease in the power generation efficiency of the fuel cell system 14, it is determined whether the hydrogen concentration in the anode flow field 48 has recovered to a threshold A (threshold A>threshold B) (see FIG. 5).

If the hydrogen concentration has not recovered to the threshold A (step S8: NO), the process returns to step S1, and the processes of steps S1 to S5, step S6 (in the case of YES), step S7, and step S8 (in the case of NO) are repeated.

When the hydrogen concentration has recovered to the threshold A (step S8: YES), the bleed valve 158 is closed in step S9.

In this case, as shown in "during closing of bleed valve" in FIG. 6, power generation of the power generation cell 40 returns to normal, and the generated cell voltage Vcell rises to a normal voltage and is thus recovered.

When the generated voltage Vfc is recovered, the generated current command value Ifccom is controlled to decrease by the current converter 90 as described with reference to the expression (1). Therefore, it is possible to avoid a change in the generated power Pfc or suppress a decrease in the generated power Pfc caused by an increase of the generated voltage Vfc due to the recovery.

Figure 7:
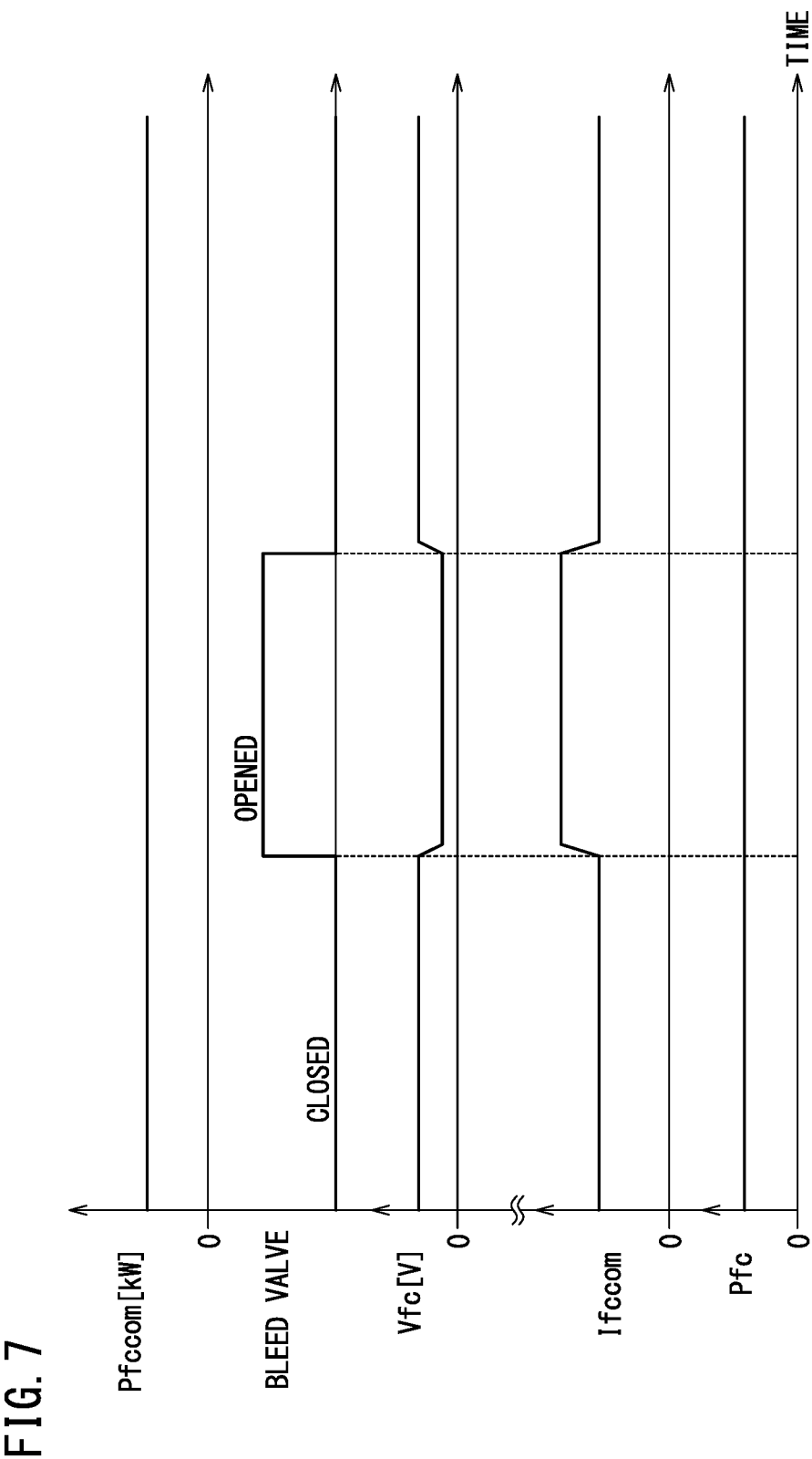
FIG. 7 is a time chart for explaining an example of the operation in the first embodiment.

FIG. 7 is a time chart showing an example of the operation in the first embodiment described with reference to the flowchart of FIG. 4.

According to the time chart of FIG. 7, the generated power command value Pfccom is maintained at a constant value regardless of the passage of time.

Figure 4:
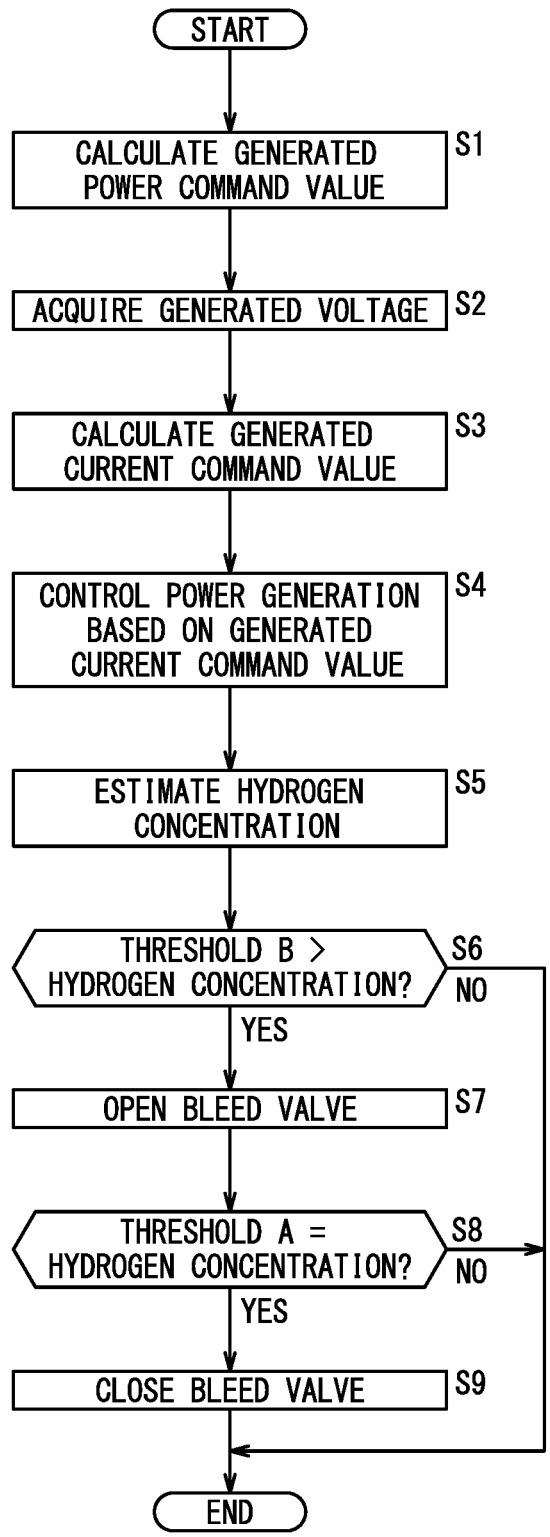
FIG. 4 is a flowchart for explaining the operation in the first embodiment.

As shown in FIG. 7, although the generated voltage Vfc decreases when the bleed valve 158 is opened, the control is performed in the order of step S7, step S8 (in the case of NO), steps S1 to S6 (in the case of YES, see also FIG. 5), and step S7 in the flowchart of FIG. 4. Therefore, in step S4, the generated current command value Ifccom is controlled to increase by an amount corresponding to the decrease, based on the expression (1) above. Therefore, the actual generated power Pfc of the fuel cell stack 16 does not fluctuate.

As described above, according to the first embodiment, the generated current command value Ifccom is controlled by the current converter 90 so as to be a value obtained by dividing the generated power command value Pfccom by the generated voltage Vfc. Therefore, even if the bleed valve 158 is opened, there is no need to change the power generation control during closing of the bleed valve 158 (during normal control), and the control can be simplified.

In the first embodiment, during opening of the bleed valve 158, a portion of the fuel gas (including nitrogen) in the fuel exhaust gas that has not been consumed by the catalytic reaction on the cathode 42 side is discharged from the oxygen-containing gas outlet communication port 102 as indicated by broken line arrows in FIG. 3.

A portion of the fuel gas that has not been consumed and is discharged from the oxygen-containing gas outlet communication port 102 is mixed with the oxygen-containing gas by opening the bypass valve 122, and diluted and discharged to the atmosphere through the diluter 66 and the pipeline 124.

In this case, it is necessary to discharge, from the air pump 26, extra amount of the oxygen-containing gas corresponding to the amount of the oxygen-containing gas flowing through the bypass valve 122. However, since the amount of the fuel gas that needs to be diluted is reduced due to the electrode reaction at the cathode 42, it is possible to suppress an increase in the discharge amount of the oxygen-containing gas from the air pump 26.

As a result, it is possible to improve the merchantability related to noise and vibration of the fuel cell vehicle 10 caused by noise and vibration of the air pump 26.

[3] Description of Operation of Setting Generated Current Command Value Ifccom According to Second Embodiment in Consideration of Decrease in Hydrogen Concentration in Anode Flow Field 48

Figure 8:
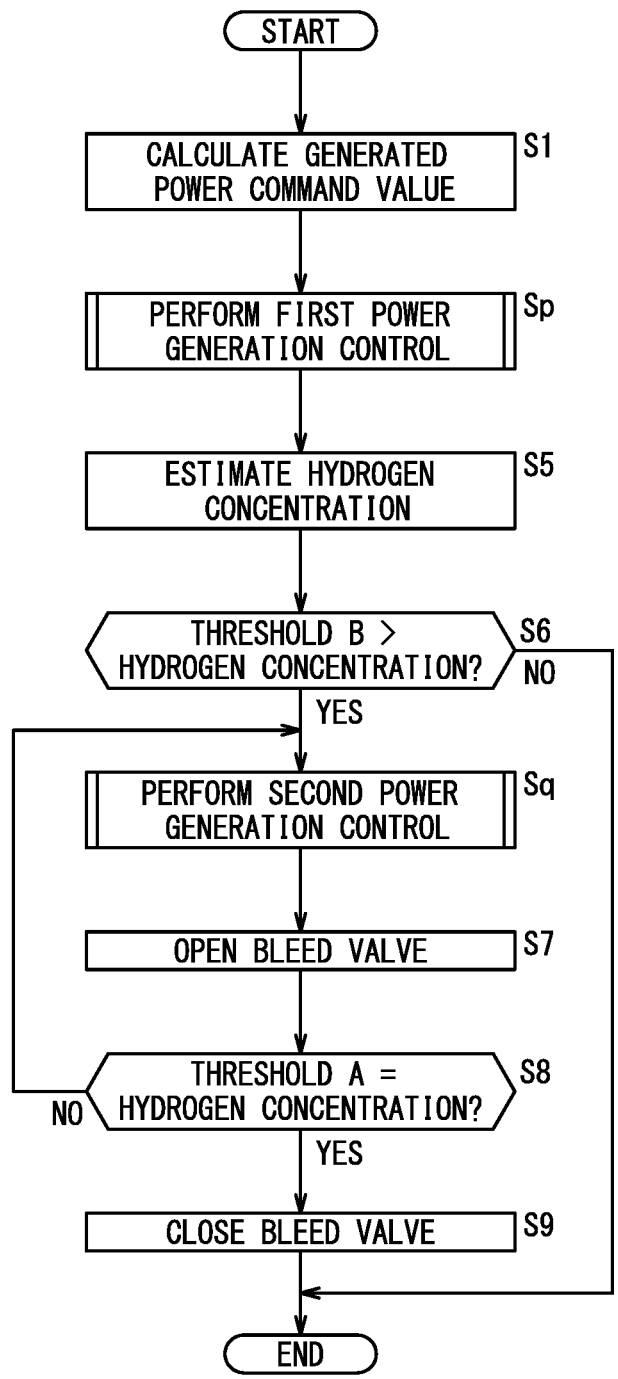
FIG. 8 is a flowchart for explaining the operation in the second embodiment.

Referring to the flowchart of FIG. 8, the operation of setting the generated current command value Ifccom according to the second embodiment will be described. In the flowchart of FIG. 8, the same step number is assigned to a process (step) corresponding to the process (step) shown in the flowchart of FIG. 4, and a detailed description thereof is omitted.

In the second embodiment, as shown in the schematic block diagram of FIG. 2B, the current converter 90 in FIG. 1 in the first embodiment is replaced by a current converter 90A including the current converter 90 described with reference to FIG. 2A and a power/current conversion map 91.

In step S1, as in the first embodiment, a generated power command value Pfccom to be generated in the fuel cell stack 16 is calculated based on the accelerator position θa, the vehicle speed Vs, and the SOC.

Figure 2B:
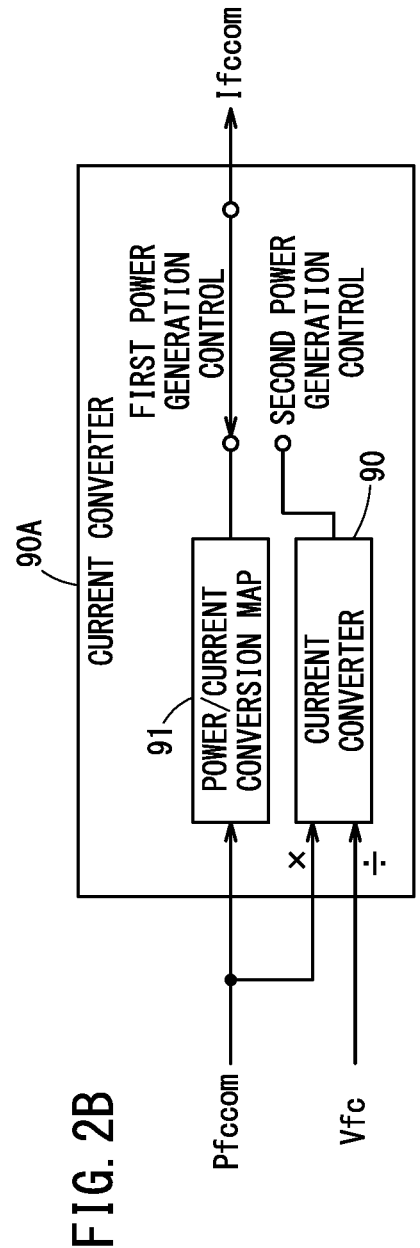
FIG. 2B is a schematic block diagram of a current converter, which is another function of the control device in FIG. 1 according to a second embodiment.

Next, in step Sp, when the bleed valve 158 is closed, as shown in FIG. 2B, first power generation control is performed in which a generated current command value Ifccom is set based on the generated power command value Pfccom by using the power/current conversion map 91 (characteristics of the generated current relative to the generated power of the fuel cell stack 16). In this case, power generation control for the fuel cell stack 16 is performed so that the generated current Ifc detected by the current sensor 93 is equal to Ifccom.

Next, in step S5, the hydrogen concentration in the anode flow field 48 is estimated in the same manner as in the first embodiment.

Next, when the hydrogen concentration is less than the threshold B in the hydrogen concentration determination in step S6 (step S6: YES), prior to processing of opening the bleed valve 158 in step S7, the control is switched to second power generation control in which the generated current command value Ifccom is set by the current converter 90 based on the generated power command value Pfccom and the generated voltage Vfc in step Sq (see FIG. 2B).

Specifically, in the second power generation control in step Sq, a generated voltage Vfc is acquired by the voltage sensor 92 in the same manner as in step S2 in the first embodiment. Next, in the same manner as in step S3, the current converter 90 in the current converter 90A of the control device 12 calculates a generated current command value Ifccom based on the generated power command value Pfccom and the generated voltage Vfc with reference to the above expression (1). Further, in the same manner as in step S4, power generation control for the fuel cell stack 16 is performed so that the generated current Ifc detected by the current sensor 93 is equal to Ifccom based on the generated current command value Ifccom.

Thus, during the opening of the bleed valve 158, the control is continued in the order of step S7, step S8 (in the case of NO, see also FIG. 5), and step Sq, and the second power generation control is executed.

FIG. 9 is a time chart showing an example of the operation in the second embodiment described with reference to the flowchart of FIG. 8.

According to the time chart of FIG. 9, the generated power command value Pfccom is maintained at a constant value regardless of the passage of time, as in the first embodiment.

As shown in FIG. 9, when the bleed valve 158 is closed, in other words, when the generated voltage Vfc does not decrease due to shortage of the oxygen-containing gas, the processes of steps S1 to S5 and step S6 (in the case of NO) are repeated after the process of step S9. Therefore, the actual generated power Pfc is maintained at the generated power command value Pfccom by the first power generation control that uses the power/current conversion map 91.

Further, when the bleed valve 158 is opened, the generated voltage Vfc decreases, but in this case, the processes of step S8 (in the case of NO), step Sq, and step S7 are executed and the current command value conversion logic is switched to the second power generation control. Therefore, the generated current command value Ifccom is increased by the current converter 90 in the current converter 90A based on the above expression (1), so that the actual generated power Pfc is maintained at the generated power command value Pfccom.

In the second embodiment, when the hydrogen concentration in the anode flow field 48 (on the anode 43 side) approaches the threshold B, the control is switched (step Sq)

before the bleed valve 158 is actually opened (step S7) in consideration of the time lag of the bleed valve 158 which is an electromagnetic valve.

It is when the fuel exhaust gas enters the cathode flow field 47 (cathode 42) that the generated cell voltage Vcell decreases due to the opening of the bleed valve 158. Therefore, there is basically no problem as long as the control is switched to the second power generation control after a little time has passed (for example, about 100 [ms]) from the opening of the bleed valve 158.

Similarly, the timing of returning to the first power generation control may be a timing at which the fuel exhaust gas does not enter the cathode flow field 47 (cathode 42). In practice, the amount of the entering fuel exhaust gas becomes very small in 10 to 100 [ms].

As described above, the slope of the increase or decrease of the hydrogen concentration in the anode flow field 48 (anode 43) (see FIG. 5) can be estimated based on the internal temperature of the fuel cell stack 16 (the above-described temperature Tw of the coolant can be used instead), the cathode inlet pressure Pci, and the anode inlet pressure Pai.

Therefore, since the timing of opening the bleed valve 158 is also predicted in consideration of this slope, the threshold B can be made slightly higher to cope with the situation.

Also in the second embodiment, during opening of the bleed valve 158, it is possible to suppress an increase in the discharge amount of the oxygen-containing gas from the air pump 26 for dilution, and to improve the merchantability related to noise and vibration of the fuel cell vehicle 10, as described in the first embodiment.

INVENTIONS THAT CAN BE GRASPED FROM EMBODIMENTS

The invention that can be grasped from the above embodiments will be described below. For convenience of understanding, some of the components are denoted by the reference numerals used in the above embodiments, but the components are not limited to those denoted by the reference numerals.

The fuel cell system 14 according to the present invention comprises a fuel cell configured to generate power using a fuel gas supplied to an anode 43 through a fuel gas supply flow path and an oxygen-containing gas supplied to a cathode 42 through an oxygen-containing gas supply flow path, the fuel cell system 14 further comprising: a fuel exhaust gas flow path through which a fuel exhaust gas discharged from the anode flows; a connection flow path configured to allow the fuel exhaust gas flow path and the oxygen-containing gas supply flow path to communicate with each other; an on-off valve configured to open or close the connection flow path; a control device 12 configured to control a state of supply of the fuel gas to the fuel cell and a state of supply of the oxygen-containing gas to the fuel cell; and a voltage acquirer configured to acquire a generated voltage (Vfc) of the fuel cell, wherein, when controlling a power generation state of the fuel cell based on a generated current command value Ifccom, the control device sets the generated current command value Ifccom based on a generated power command value Pfccom and the generated voltage Vfc acquired by the voltage acquirer.

As a result, even when the on-off valve is opened to cause the fuel exhaust gas to flow through the cathode and the generated voltage of the fuel cell therefore decreases, the generated current command value is increased based on the decrease in the generated voltage. Therefore, the generated power does not change. Since the power generation control is not changed in this control, the control can be simplified.

Further, the fuel cell system according to the present invention comprises a fuel cell configured to generate power using a fuel gas supplied to an anode through a fuel gas supply flow path and an oxygen-containing gas supplied to a cathode through an oxygen-containing gas supply flow path, the fuel cell system further comprising: a fuel exhaust gas flow path through which a fuel exhaust gas discharged from the anode flows; a connection flow path configured to allow the fuel exhaust gas flow path and the oxygen-containing gas supply flow path to communicate with each other; an on-off valve configured to open or close the connection flow path; a control device configured to control a state of supply of the fuel gas to the fuel cell and a state of supply of the oxygen-containing gas to the fuel cell; and a voltage acquirer configured to acquire a generated voltage of the fuel cell, wherein, when controlling a power generation state of the fuel cell based on a generated current command value, the control device performs first power generation control in which the generated current command value is set based on a generated power command value during closing of the on-off valve, and performs second power generation control in which the generated current command value is set based on the generated power command value and the generated voltage during opening of the on-off valve.

As a result, during power generation, when the concentration of the fuel gas flowing through the anode decreases due to the influence of nitrogen gas permeating from the cathode side to the anode, and the on-off valve of the connection flow path allowing the fuel exhaust gas flow path and the oxygen-containing gas supply flow path to communicate with each other is therefore opened, the generated current command value is set based on the generated power command value and the generated voltage. Therefore, the generated power of the fuel cell does not change or the change of the generated power of the fuel cell can be suppressed even if the fuel gas concentration control (fuel gas concentration decrease prevention control) at the anode is performed.

Further, the fuel cell system may further comprise a fuel gas concentration acquiring unit configured to acquire a concentration of the fuel gas flowing through the anode, and the control device may open the on-off valve when the concentration of the fuel gas acquired by the fuel gas concentration acquiring unit becomes equal to or less than a predetermined value.

As a result, deterioration of the electrolyte membrane due to a decrease in the concentration of the fuel gas flowing through the anode can be suppressed.

The fuel cell system may further comprise a fuel gas concentration acquiring unit configured to acquire a concentration of the fuel gas flowing through the anode, and the control device may switch from the first power generation control to the second power generation control before opening the on-off valve when the concentration of the fuel gas acquired by the fuel gas concentration acquiring unit becomes equal to or less than a predetermined value.

This makes it possible to achieve both suppression of deterioration of the electrolyte membrane and appropriate control for the generated power command value.

It is to be understood that the present invention is not limited to the above-described embodiments, and various configurations can be adopted therein based on the description of this specification.

What is claimed is:

1. A fuel cell system comprising:
a fuel cell configured to generate power using a fuel gas supplied to an anode through a fuel gas supply flow path and an oxygen-containing gas supplied to a cathode through an oxygen-containing gas supply flow path,
the fuel cell system further comprising:
a fuel exhaust gas flow path through which a fuel exhaust gas discharged from the anode flows;
a connection flow path configured to allow the fuel exhaust gas flow path and the oxygen-containing gas supply flow path to communicate with each other, the fuel exhaust gas flowing through the connection flow path;
an on-off valve configured to open or close the connection flow path;
a control device configured to control a state of supply of the fuel gas to the fuel cell and a state of supply of the oxygen-containing gas to the fuel cell, the control device comprising one or more processors that execute computer-executable instructions stored in a memory; and
a voltage acquirer configured to acquire a generated voltage of the fuel cell, wherein
when controlling a power generation state of the fuel cell based on a generated current command value, the one or more processors execute the computer-executable instructions to cause the control device to:
close the on-off valve to perform first power generation control in which the generated current command value is set based on a generated power command value; and
open the on-off valve to perform second power generation control in which the generated current command value is set based on the generated power command value and the generated voltage during opening of the on-off valve so that the fuel exhaust gas that has flowed through the connection flow path and the oxygen-containing gas supply flow path is supplied to the cathode together with the oxygen-containing gas and an amount of the fuel gas to be supplied to the anode through the fuel gas supply flow path is increased.

2. The fuel cell system according to claim 1, further comprising a fuel gas concentration acquiring unit configured to acquire a concentration of the fuel gas flowing through the anode, wherein
the one or more processors cause the control device to open the on-off valve when the concentration of the fuel gas acquired by the fuel gas concentration acquiring unit becomes equal to or less than a predetermined value.

3. The fuel cell system according to claim 1, further comprising a fuel gas concentration acquiring unit configured to acquire a concentration of the fuel gas flowing through the anode, wherein
the one or more processors cause the control device to switch from the first power generation control to the second power generation control before opening the on-off valve when the concentration of the fuel gas acquired by the fuel gas concentration acquiring unit becomes equal to or less than a predetermined value.

* * * * *